United States Patent [19]

Ihm et al.

[11] Patent Number: 5,484,861

[45] Date of Patent: Jan. 16, 1996

[54] BIODEGRADABLE COPOLYESTER AND METHOD FOR PREPARING THE SAME

[75] Inventors: Dae W. Ihm, Seoul; Myung S. Lee; Hae S. Jun, both of Suwon; Chang S. Lee, Anyang; Jung: Sung G.; Seong I. Woo, both of Seoul, all of Rep. of Korea

[73] Assignees: Cheil Synthetics Inc., Kyungsan; Korea Advanced Institute of Science & Technology, Taejon, both of Rep. of Korea

[21] Appl. No.: 375,947

[22] Filed: Jan. 20, 1995

[51] Int. Cl.$^6$ ........................ C08F 20/00
[52] U.S. Cl. ............... 525/450; 525/437; 525/444; 525/450; 524/700; 524/779; 528/361
[58] Field of Search .................... 525/437, 444, 525/450; 524/700, 779

[56] References Cited

U.S. PATENT DOCUMENTS

| | | | |
|---|---|---|---|
| 4,537,738 | 8/1985 | Holmes | 264/210.5 |
| 5,180,765 | 1/1993 | Sinclair | 524/306 |
| 5,185,408 | 2/1993 | Tang et al. | 525/415 |

*Primary Examiner*—Samuel A. Acquah
*Attorney, Agent, or Firm*—Nikaido, Marmelstein, Murray & Oram

[57] ABSTRACT

There is disclosed a biodegradable copolyester having a combination structure consisting of one or more repeating unit of alkyleneterephthalate and one or more repeating unit of hydroxyalkanoate, represented by the following general formula I:

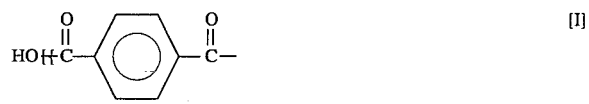

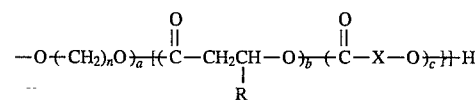

wherein n is an integer not more than 10,
R is —$CH_3$ or —$C_2H_5$,
X is,

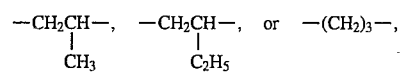

and a, b and c are independently a natural number, along with a preparation method therefor.

An aromatic polyester have repeating unit of alkyleneterephthalate is reacted with an aliphatic polyester having repeating unit of hydroxyalkanoate at 100° C. or more in a proper solvent, such as nitrobenzene and dimethylsulfoxide, in the presence of a catalyst, such as dibutyltin oxide, tin[IV] chloride, tin[IV] octoate, hexabutyl distannoxane, tributyltin methoxide, or tributyltin chloride. It is superior in biodegradability and can be produced in low cost.

7 Claims, 3 Drawing Sheets

BIODEGRADABLE COPOLYESTER AND METHOD FOR PREPARING THE SAME

BACKGROUND OF THE INVENTION

1. Field of the Invention

The present invention relates, in general, to a biodegradable copolyester and, more particularly, to a copolyester copolymerized with an aromatic polyester having a number average molecular weight of not less than 5,000 and an aliphatic polyester biosynthesized by microorganism fermentation. Also, the present invention is concerned with an economical method for preparing the biodegradable copolyester.

2. Description of the Prior Art

Polyester, especially, polyethylene terephthalate has good mechanical properties, chemical resistance, and durability and is useful for various fields of everyday life including substitutes for natural fibers, bottles, plastics and the like. Unlike the natural materials, the polymer, however, has a fatal weakness that it cannot be reduced into nature after use. In other words, synthetic plastics are little or by no means degraded of themselves. Disposable packaging materials, which have sharply been increased in demand, are little reclaimed relative to their tremendous consumption and thus, most of them are wasted. In addition, agricultural film is very difficult to completely regain.

As the environmental pollution caused by the plastics is issued as a serious social problem, many research and development efforts have been directed to biodegradable resins with invoking worldwide interest. In an effort of the protection of environment, degradable resins, which are degraded of themselves after discard, have recently been developed.

Degradable resins are generally grouped into biodegradable resins, which are degraded by microorganisms present in soil, and photodegradable resins, which are degraded by ultra violet ray of day light. When the photodegradable resins are buried in soil, they are hard to degrade because they are little or by no means exposed to the sun. Accordingly, the biodegradable resins are more preferred.

Exemplary biodegradable resins include poly(hydroxyalkanoate) resins, which are synthesized by microorganisms in vivo, and polycaprolactone resins, which are a kind of synthetic polymer.

Such poly(hydroxyalkanoate) resins and polycaprolactone resins are good in biodegradability, but uneconomical due to their high production cost. In addition, the applied physical properties thereof are poor and thus, are low in an aspect of practical value.

SUMMARY OF THE INVENTION

Therefore, it is an object of the present invention to overcome the above problems encountered in prior arts and to provide a biodegradable copolyester.

It is another object of the present invention to provide a method for preparing a biodegradable copolyester with low production cost.

Based on the intensive and through study by the present inventors, the above object could be accomplished by a provision of a copolyester which is prepared by reacting an aromatic polyester having a number average molecular weight of at least 5,000 with an aliphatic polyester biosynthesized by microorganism fermentation in a solvent in the presence of an appropriate catalyst.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE INVENTION

Figure 1:
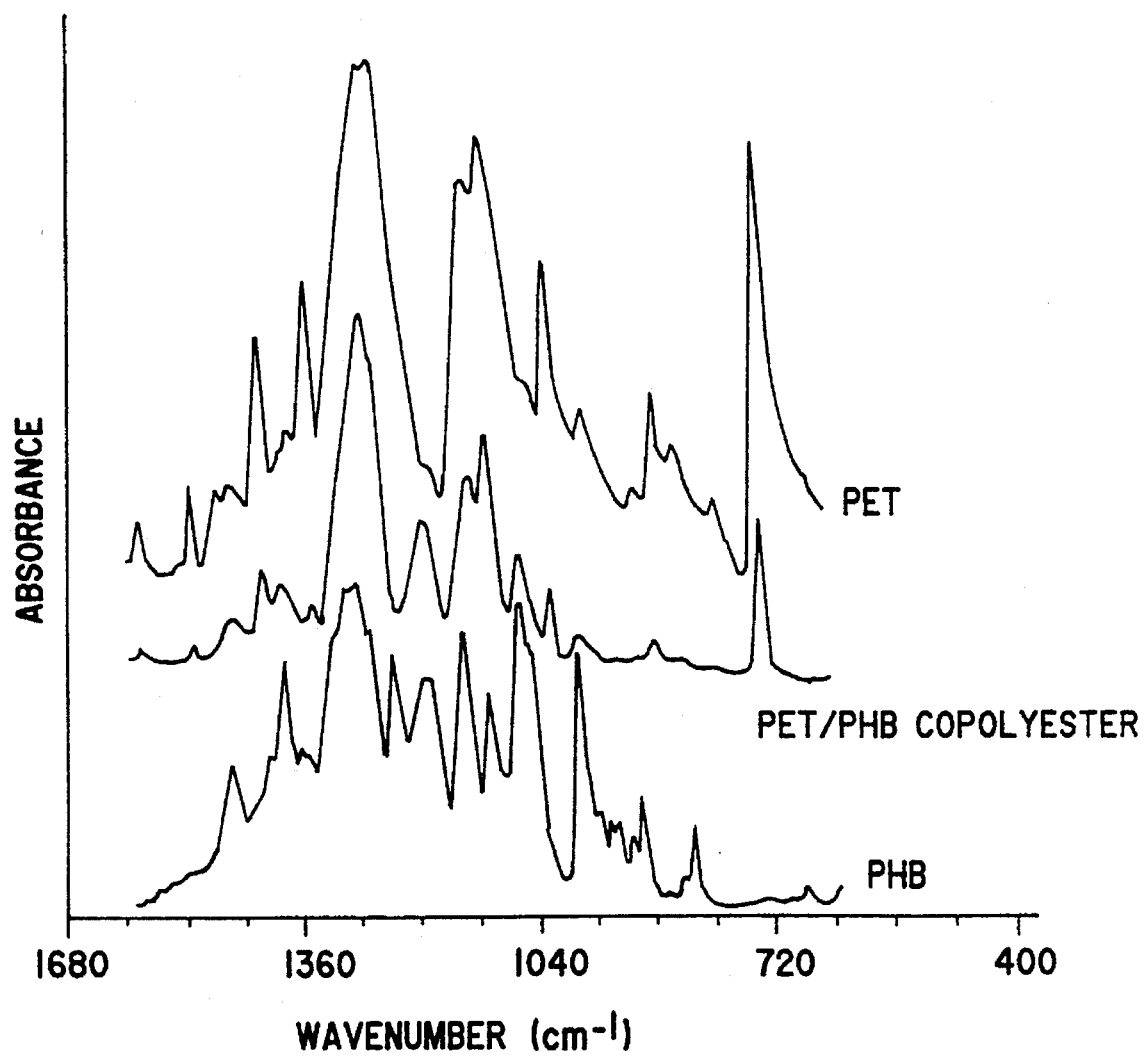
FIG. 1 shows infrared spectra for polyethylene terephthalate, poly(3-hydroxybutyrate), and a copolyester prepared in Example 1 of the present invention.

In accordance with the present invention, there is provided a biodegradable copolyester, represented by the following formula I:

$$HO\text{+}\overset{O}{\overset{\|}{C}}\text{--}\underset{}{\bigcirc}\text{--}\overset{O}{\overset{\|}{C}}\text{--}O\text{+}CH_2)_nO\text{+}_a\text{+}\overset{O}{\overset{\|}{C}}\text{--}CH_2\underset{R}{\overset{}{C}}H\text{--}O\text{+}_b\text{+}\overset{O}{\overset{\|}{C}}\text{--}X\text{--}O\text{+}_c\text{+}H \quad [I]$$

wherein n is an integer not more than 10,
R is —$CH_3$ or —$C_2H_5$,
X is, $$-CH_2\underset{CH_3}{\overset{}{C}}H-, \quad -CH_2\underset{C_2H_5}{\overset{}{C}}H-, \quad or \quad -(CH_2)_3-,$$

and
a, b and c are independently a natural number.

As displayed in the formula I, the biodegradable copolyester of the present invention has such a combination structure that one segment having at least one of repeating unit of alkylene terephthalate is bonded with the other segment having at least one of repeating unit of hydroxyalkanoate.

The aromatic polyester used in the present invention may be prepared from aromatic compounds having at least 2 carboxylic acid groups or lower alkylesters thereof, and polyols, in a usual manner. For example, the aromatic compounds or lower alkylesters thereof and the polyols are esterified or ester, interchanged and then, subjected to polycondensation under vacuum.

Preferred aromatic compounds include dicarboxylic acids such as terephthalic acid, isophthalic acid and 1,4-cyclohexanedicarboxylic acid, and acid ester compounds such as dimethylterephthalate, dibutylterephthalate, dimethylisophthalate and dibutylisophthalate. As a copolymeric component, a trifunctional acid compound such as 1,3,5-benzenetricarboxylic acid, 1,2,4-bezenetricarboxylic acid and anhydrous trimellitic acid may be used at a small amount along with the bifunctional acid compounds or lower alkylesters.

As polyols usable in the present invention; there are exemplified ethylene glycol, 1,2-propane diol, 1,3-propane diol, 1,4-butane diol, 1,5-pentane diol, 1,6-hexane diol, and 1,4-cyclohexane dimethanol. In addition, there may be used those that are polymerized with trimethylol ethane, trimethylol propane, glycerine, pentaerythritol or tris(2-hydroxyethyl)isocyanurate, along with bifunctional glycol components, in a small degree.

It is preferred that the aromatic polyester synthesized by combination of the components has a number average molecular weight of at least 5,000 for better mechanical properties of the biodegradable copolyester. More preferably, the aromatic polyester has a number average molecular weight of 10,000 or more. For example, if the number average molecular weight is below 5,000, the resulting biodegradable copolyester is problematic in such mechanical properties as tensile strength and elongation.

To express biodegradability, there is used as the other segment for the biodegradable copolyester which is synthesized by microorganism fermentation. Poly(3-hydroxybutyrate), poly(3,hydroxybutyrate-co-3-hydroxyvalerate), poly(4-hydroxybutyrate) and poly(3-hydroxybutyrate-co-4-hydroxybutyrate) are exemplified as the aliphatic polyester.

The present invention also pertains to a method for the preparation of biodegradable copolyester. For the preparation, aromatic polyester is charged in a reactor containing a solvent along with aliphaticpolyester biosynthesized by microorganism fermentation and then, the reactants are stirred at 100° C. or more under nitrogen atmosphere in the presence of a catalyst, to give copolyester of formula I.

Preferred solvent used in the present invention includes nitrobenzene and dimethylsulfoxide.

As a catalyst for the synthesis of the biodegradable polyester, it is preferred to use dibutyltin oxide, tin[IV] chloride, tin[IV] octoate, hexabutyl distannoxane, tributyltin methoxide, or tributyltin chloride due to their superior catalytic activity.

The preferred embodiments of the present invention will now be further described with reference to specific examples.

In the following examples, biodegradability was tested according to ASTM G21-70 and a composting method. In ASTM G21-70, a sample film was put on a solid agar medium on which a spore mixture solution of *Aspergillus niger, Penicillium funiculosum, Trichoderma* sp. and *Pullularia pullulans* was then dispersed in a predetermined amount. After two to four weeks, the propagation of the fungi was measured and graded. That is, fungi's occupying 10% or less of the area of the sample was graded as 1, 10 to 30% as 2, 30 to 60% as 3, and 60% or more as 4.

For the test according to composting method, a medium was composed as listed in the following Table 1 which shows a waste composition similar to a practical situation of Korea. The inner conditions of the medium were settled as shown in the following Table 2, and then, a sample was inserted therein. After 10 weeks, the biodegradability was graded by measuring weight reduction of the sample.

TABLE 1

| Material | Content (wt %) |
| --- | --- |
| Foodstuffs | 39.8 |

TABLE 1-continued

| Material | Content (wt %) |
| --- | --- |
| (rice cake, cabbage, pork, fish paste) | |
| Papers | 20.7 |
| (computer paper, daily paper) | |
| Sawdust | 5.3 |
| Glasses | 7.3 |
| Plastics | 7.7 |
| Rubber | 4.5 |
| Leaf | 14.7 |

TABLE 2

| Condition | Content |
| --- | --- |
| pH | 7.0 |
| Water Content of Medium | 60.0% |
| Carbon of Medium/Initial Nitrogen value | 23.0 |
| Aeration Speed | 100 ml/min. |
| Inner Temp. maintained | 55.0° C. |

EXAMPLE 1

In a reactor equipped with a stirrer, a condenser, a gas inductor and a thermometer, 5 parts by weight of polyethylene terephthalate with a number average molecular weight of 15,000, 5 parts by weight of poly(3-hydroxybutyrate) with a number average molecular weight of 37,000, 89.9 parts by weight of nitrobenzene and 0.1 part by weight of dibutyltin oxide were added and then, heated at 170° C. for 24 hours under nitrogen atmosphere, to obtain a crude product. Thereafter, the crude product was precipitated in an excess of methanol and the precipitate was filtered. The precipitate was dissolved in a mixture solvent of orthochlorophenol/chloroform. An excess of methanol was added to, precipitate purified copolyester.

The obtained polyester was tested for physical properties, and the results are given as listed in the following Table 3.

Production of the copolyester was confirmed through infrared spectrum and nuclear magnetic resonance spectrum analyses. The following is of these spectrum analyses.

Referring to FIG 1, there are shown infrared spectra for the copolymer of polyethylene terephthalate and poly(3-hydroxybutyrate), polyethylene terephthalate, and poly(3-hydroxybutyrate). As shown in this figure, the infrared spectrum for the copolymer prepared exhibits characteristic peaks of polyethylene terephthalate, 727 $cm^{-1}$, 1017 $cm^{-1}$ and 1341 $cm^{-1}$ and characteristic peaks of poly(3-hydroxybutyrate) 1058 $cm^{-1}$ and 1174 $cm^{-1}$. As apparent from the presence of all characteristic peaks, the copolyester prepared in Example 1 has a coexistent structure of polyethylene terephthalate and poly(3-hydroxybutyrate).

Figure 2:
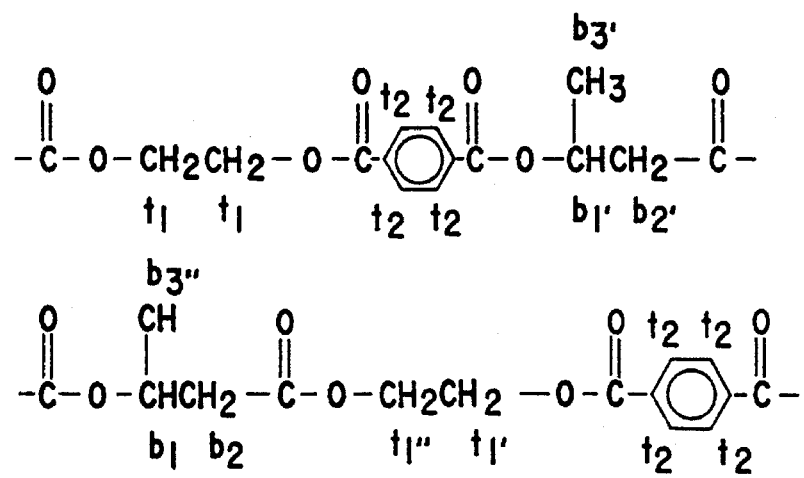
FIG. 2 is a $^1H$ nuclear magnetic resonance spectrum for a copolyester prepared in Example 1 of the present invention.
Figure 2:
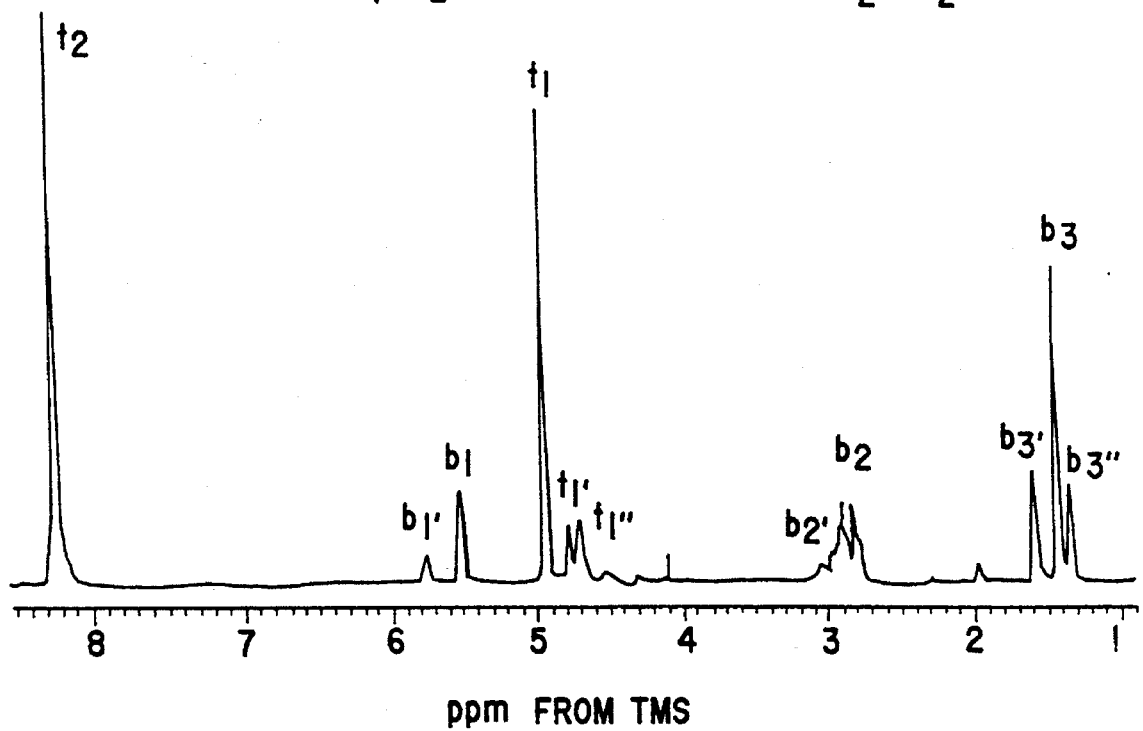

Referring to FIG. 2, there is shown a $^1H$ nuclear magnetic resonance spectrum for the prepared copolyester. In this spectrum, there are a peak 4.93 ppm corresponding to the hydrogens of —$OCH_2$ of polyethylene terephthalate and a peak 5.51 ppm corresponding to the hydrogen of —OCH of poly(3-hydroxybutyrate). In addition to the characteristic peaks of the components, the spectrum exhibits new peaks, 4.70 ppm, 4.78 ppm, and 5.75 ppm, which are correspondent to the hydrogens of the bonding portions between polyethylene terephthalate and poly(3-hydroxybutyrate).

Figure 3:
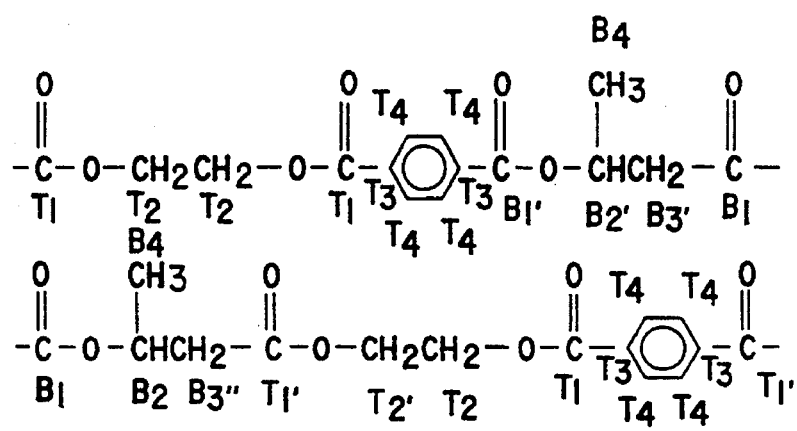
FIG. 3 is a $^{13}C$ nuclear magnetic resonance spectrum for a copolyester prepared in Example 1 of the present invention.
Figure 3:
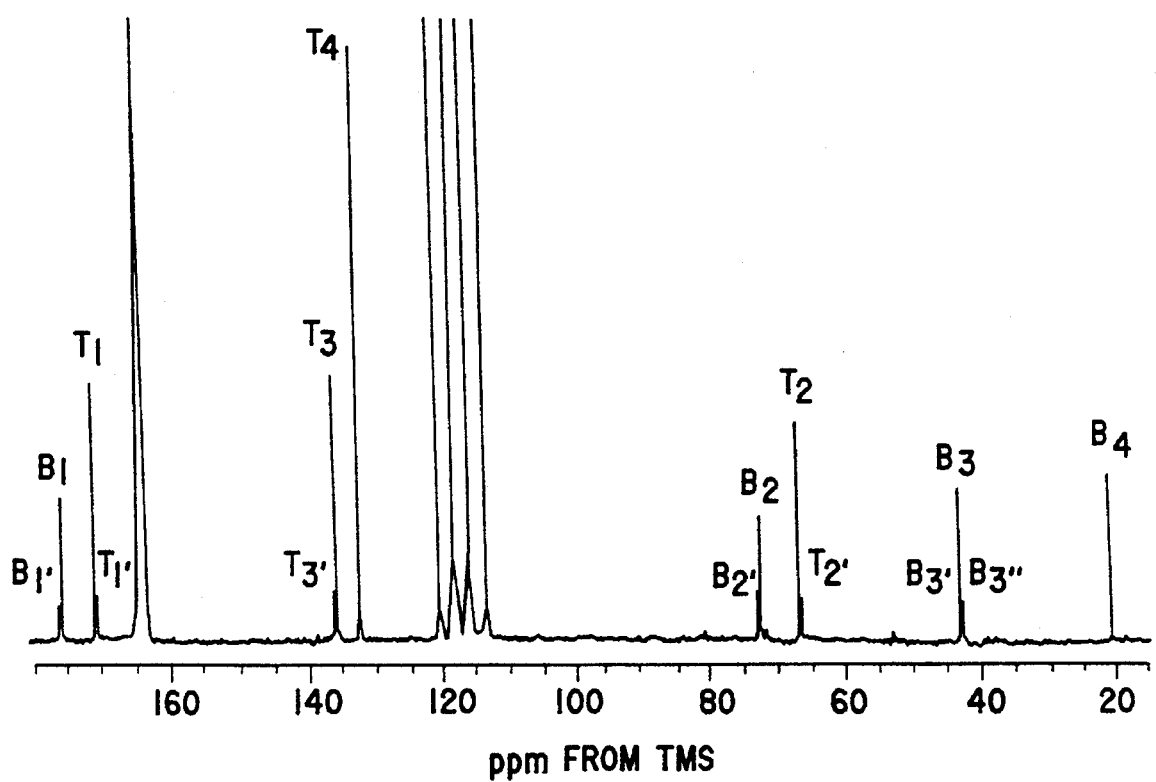

Turning now to FIG. 3, there is shown a $^{13}C$ nuclear magnetic resonance spectrum for the prepared copolyester. As shown in this figure, the spectrum has a peak 66.3 ppm corresponding to the carbon of —OCH$_2$ of polyethylene terephthalate, a peak 72.1 ppm corresponding to the carbon of —OCH of poly(3-hydroxybutyrate), a peak 170.9 ppm corresponding to the carbonyl groups of polyethylene terephthalate, and a peak 175.7 ppm corresponding to the carbonyl groups of poly(3-hydroxybutylate). In addition, there are exhibited new peaks which testify the bond of polyethylene terephthalate and poly(3-hydroxybutyrate). That is, in this spectrum, peaks 65.8 ppm and 72.6 ppm are correspondent to the carbons of the bond, whereas peaks 170.2 ppm and 176.5 ppm correspond to the carbonyl groups of the bond therebetween.

EXAMPLE 2

A copolyester was prepared in a similar manner to that of Example 1, except that 3 parts by weight of polyethylene terephthalate and 7 parts by weight of poly(3-hydroxybutyrate) were used.

The physical properties of the copolyester are given as listed in the following Table 3.

EXAMPLE 3

A copolyester was prepared in a similar manner to that of Example 1, except that 7 parts by weight of polyethylene terephthalate and 3 parts by weight of poly(3-hydroxybutyrate) were used.

The physical properties of the copolyester are given as listed in the following Table 3.

EXAMPLE 4

A copolyester was prepared in a similar manner to that of Example 1, except that 5 parts by weight poly ( 3-hydroxybutyrate-co-3-hydroxyvalerate) with a number average molecular weight of 280,000 in which a unit structure of 3-hydroxyvalerate amounts to 12 mole % of the total unit structures was used in lieu of poly(3-hydroxybutyrate).

The physical properties of the copolyester are given as listed in the following Table 3.

EXAMPLE 5

In a reactor equipped with a stirrer, a condenser, a gas inductor and a thermometer, 5 parts by weight of polybutylene terephthalate with a number average molecular weight of 420,000, 5 parts by weight of poly(3-hydroxybutyrate) with a number average molecular weight of 350,000, 89.9 parts by weight of nitrobenzene and 0.1 part by weight of tributyltin methoxide were added and then, heated at 160° C. for 24 hours under nitrogen atmosphere. Subsequent steps were carried out in the same manner as that of Example 1.

The physical properties of the copolyester prepared are given as listed in the following Table 3.

EXAMPLE 6

A copolyester was prepared in a similar manner to that of Example 5, except that 5 parts by weight of poly ( 3-hydroxybutyrate-co-3-hydroxyvalerate) with a number average molecular weight of 1,280,000 in which a unit structure of 3-hydroxyvalerate amounts to 12 mole % of the total unit structures was used in lieu of poly(3-hydroxybutyrate).

The physical properties of the copolyester are given as listed in the following Table 3.

EXAMPLE 7

A copolyester was prepared in a similar manner to that of Example 5, except that 5 parts by weight of poly( 3-hydroxybutyrate-co-4-hydroxybutyrate) with a number average molecular weight of 190,000 in which a unit structure of 4-hydroxybutyrate amounts to 10 mole % of the total unit structures was used in lieu of poly(3-hydroxybutyrate).

The physical properties of the copolyester are given as listed in the following Table 3.

TABLE 3

| Exam. No. | Melting Point (°C.) | No. Avg. Mw | Poly-dispersibility | Biodegradability Grade | Weight Loss (%) |
|---|---|---|---|---|---|
| 1 | 205 | 22,000 | 1.63 | 3 | 64.5 |
| 2 | 185 | 20,500 | 1.71 | 4 | 75.8 |
| 3 | 211 | 18,900 | 1.68 | 3 | 55.1 |
| 4 | 184 | 16,700 | 1.67 | 4 | 70.3 |
| 5 | 179 | 28,200 | 1.73 | 4 | 69.2 |
| 6 | 174 | 25,800 | 1.65 | 4 | 73.7 |
| 7 | 193 | 24,700 | 1.95 | 3 | 60.6 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and cope of the invention as described and claimed.

What is claimed is:

1. A copolyester having a combination structure consisting of one or more repeating unit of alkyleneterephthalate and one or more repeating unit of hydroxyalkanoate, represented by the following general formula I:

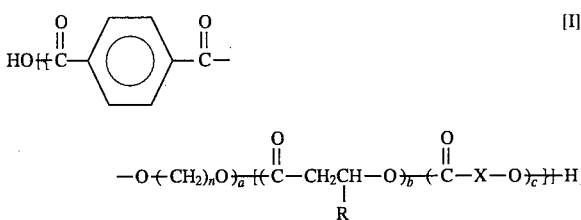

wherein n is an integer not more than 10,

R is —CH$_3$ or —C$_2$H$_5$,

X is,

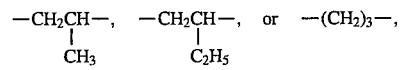

and a, b and c are independently a natural number.

2. A method for preparing a copolyester represented by the following general formula I:

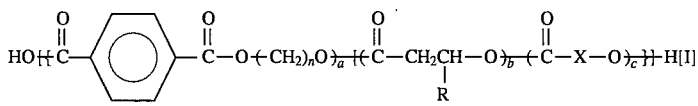

wherein n is an integer not more than 10,
R is —CH$_3$ or —C$_2$H$_5$,
X is,

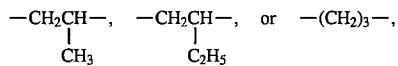

and a, b and c are independently a natural number, comprising reacting an aromatic polyester have repeating unit of alkyleneterephthalate with an aliphatic polyester having repeating unit of hydroxyalkanoate in a solvent at 100° C. or more in the presence of a catalyst.

3. A method set forth as claim 2, wherein said aromatic polyester is a polyethylene terephthalate with a number average molecular weight of not less than 10,000.

4. A method set forth as claim 2, wherein said aromatic polyester is a polybutylene terephthalate with a number average molecular weight of not less than 10,000.

5. A method set forth as claim 2, wherein said aliphatic polyester is poly(3-hydroxybutyrate) which is biosynthesized by microorganism fermentation.

6. A method set forth as claim 2, wherein said aliphatic polyester is poly(3-hydroxybutyrate-co-3-hydroxyvalerate) which is biosynthesized by microorganism fermentation.

7. A method set forth as claim 2, wherein said aliphatic polyester is poly(3-hydroxybutyrate-co-4-hydroxybutyrate) which is biosynthesized by microorganism fermentation.

* * * * *

UNITED STATES PATENT AND TRADEMARK OFFICE
CERTIFICATE OF CORRECTION

PATENT NO. : 5,484,861
DATED : Jan. 16, 1996
INVENTOR(S) : Ihm et al

It is certified that error appears in the above-identified patent and that said Letters Patent is hereby corrected as shown below:

On title page,
Item [75], line 3 please delete "Jung:Sung G." insert therefor

--Sung G. Jung, Seoul;--

Signed and Sealed this

Twenty-fifth Day of March, 1997

Attest:

BRUCE LEHMAN

Attesting Officer

Commissioner of Patents and Trademarks